US005923619A

United States Patent [19]

Knapen et al.

[11] Patent Number: 5,923,619

[45] Date of Patent: Jul. 13, 1999

[54] GENERATOR

[75] Inventors: Petrus Matheus Josephus Knapen, Tilburg; Paulus Adrianus Ferdinand Maria Goemans, Oedenrode; Bernardus Johannes Meyer, Tilburg, all of Netherlands

[73] Assignee: Kinetron B.V., Tilburg, Netherlands

[21] Appl. No.: 07/983,546

[22] PCT Filed: Aug. 5, 1991

[86] PCT No.: PCT/NL91/00145

§ 371 Date: Feb. 3, 1993

§ 102(e) Date: Feb. 3, 1993

[87] PCT Pub. No.: WO92/04662

PCT Pub. Date: Mar. 19, 1992

[30] Foreign Application Priority Data

Sep. 7, 1990 [NL] Netherlands ........................... 9001976

[51] Int. Cl.[6] ............................... G04B 1/00; G04C 3/00; H01M 10/46; H02K 21/14

[52] U.S. Cl. .......................... 368/64; 368/204; 310/75 A; 310/156; 320/21; 322/10

[58] Field of Search ............................. 368/64, 163, 179, 368/180, 183, 203, 204; 310/75 R, 75 A, 156; 320/2, 21, 41, 42, 61; 322/1, 3, 4, 10

[56] References Cited

U.S. PATENT DOCUMENTS

| | | | |
|---|---|---|---|
| 2,791,732 | 5/1957 | Jones | 368/163 |
| 3,005,305 | 10/1961 | Thoma | 368/163 |
| 4,008,566 | 2/1977 | McClintock | 320/21 |
| 4,091,302 | 5/1978 | Yamashita | 368/204 |

FOREIGN PATENT DOCUMENTS

| | | |
|---|---|---|
| 0 170 303 | 2/1986 | European Pat. Off. . |
| 56-29234 | 7/1981 | Japan . |
| 60-31185 | 7/1985 | Japan . |
| 61-45892 | 3/1986 | Japan . |
| A 334 720 | 1/1959 | Switzerland . |

OTHER PUBLICATIONS

Japanese Kokai 53–42771 dated Apr. 18, 1978 for Perfect Electronic Watch Abstract Japanese Kokai 53–42772 dated Apr. 18. 1978 for Electronic Watch Abstract.

Japanese Kokai 53–42773 dated Apr. 18, 1978 for Portable Power Generator Abstract.

Japanese Kokai 53–26169 dated Mar. 10, 1978 for Generation Set for Portable Electronic Apparatus, Abstract.

Japanese Kokai 53–26170 dated Mar. 10, 1978 for Handy Electronic Watch Abstract.

Japanese Kokai 53–26171 dated Mar. 10, 1978 for Handy Watch Abstract.

Patent Abstracts of Japan vol. 2, No. 61 (E–78) (May 9, 1978) & JP A,53 026 169 (Daina Seikosha K.K.) Oct. 3, 1978.

Patent Abstracts of Japan vol. 2, No. 61 (E–78) (1788) May 9, 1978 & JP,A,53 025 472 (Daini Seikosha K.K.) Sep. 3, 1978.

Patent Abstracts of Japan vol. 1, No. 132 (E–77) (6017) Oct. 1977 & JP A,52 067 365 (Suwa Siekosha K.K.) Mar. 9, 1978.

*Primary Examiner*—Vit W. Miska
*Attorney, Agent, or Firm*—Fay, Sharpe, Beall, Fagan, Minnich & McKee, L.L.P.

[57] ABSTRACT

A generator, for miniature power consuming devices in particular, comprises a rotor wheel (4), which is coupled to a driven shaft and which has magnetized poles, a stator (5) having a plurality of windings for providing an electric voltage, a driving means (2, 33) for driving the driven shaft (3), and a transmission means having a resilient body (34) for providing a resilient transmission between said driving means and said driven shaft. Interrupting means (37) are provided for at least substantially interrupting the transmission between said driving means and said driven shaft as a function of the spring tension of said resilient body. The interrupting means preferably comprise a number of leaf springs, arranged around a disc, or a free-wheel clutch (37).

26 Claims, 4 Drawing Sheets

GENERATOR

The present invention relates to a generator, for miniature power consuming devices in particular, comprising a rotor wheel being coupled to a driven shaft and having magnetized poles, a stator having a plurality of windings for providing an electric voltage, a driving means for driving the driven shaft, and a transmission means having a resilient body for providing a resilient transmission between said driving means and said driven shaft.

Such a generator is known from European patent application EP-A-0170303, which discloses a generator suitable for being part of a wristwatch, wherein a driving means in the shape of an eccentric mass is set in motion by wearing the watch. The voltage generated by the generator can be used for charging an accumulator arranged within the watch, if it exceeds the minimum charging voltage of the accumulator. In accordance with Faraday's law, the higher the angular speed of the rotor wheel is, the higher the voltage generated by the generator will be. A relatively high angular speed can be obtained when the eccentric mass, which is coaxial to the driven shaft, is connected at an inner rim thereof to one end of a resilient body, a spiral spring in particular, the other end of which being connected to the driven shaft of the rotor wheel. Being retained in relation to the stator in one of its rest positions by a detent torque between the rotor wheel and the stator, the rotor wheel will not be carried along by the eccentric mass until the spring is tensioned to a certain extent, as a result of which—upon dislodging the rotor wheel—the potential energy stored in the spring will be available for accelerating the rotor wheel, thus increasing its angular speed. After the dislodgement of the rotor wheel due to a sufficiently large torque exerted on the driven shaft by the spring, the spring is tensioned in opposite direction, after having been fully released, resulting in a gradual reduction in the speed of the rotor wheel. After the rotor wheel has come to a standstill, it will be set in motion again by the spring, this time in the opposite direction. Thus, the rotor wheel performs an oscillatory movement, wherein the generated voltage shows an oscillating amplitude decreasing down to zero.

A drawback to this known generator is that the voltage generated by the generator each time the direction of movement of the rotor wheel is about to be reversed is unusable, as the voltage will be less than the required minimum charging voltage. During these unusable periods of voltage, however, energy losses, e.g. due to friction, continue to occur. Furthermore, for tensioning the spring in such a way that a predictable, sufficient amount of energy is produced it is required that the detent torque between the stator and the rotor wheel for the respective rest positions is uniform and of sufficient magnitude, which is hard to realize in a reproducible way in the case of stator-rotor combinations having very small dimensions. Under no circumstances stator-rotor combinations having a negligible detent torque can be applied.

The present invention aims to remove these drawbacks and to this end, in accordance with the invention, a generator of the type as mentioned in the preamble is provided, characterized in that interrupting means are provided for at least substantially interrupting the transmission between the driving means and the driven shaft as a function of the spring tension of said resilient body.

By at least substantially interrupting the resilient transmission from the driving means to the driven shaft by means of interrupting means, an oscillatory movement of the resilient body and the rotor wheel is avoided, resulting in a voltage being generated having an amplitude which exceeds continuously the minimum charging voltage for at least essentially the full period when the resilient body is being released.

In the generator according to the invention the interrupting means may comprise a rotatable supporting means which is coupled to said driving means, one end of said at least one resilient body being connected to the rotatable supporting means, the other end of which being a free end which co-operates during the rotation of said supporting means at intervals with said driven shaft in order to rotate said rotor wheel.

In this way, after the rotor wheel has been accelerated, the co-operation between the free end of the resilient body and the driven shaft can be ended, after which the rotor wheel can freely rotate at a high speed during the interruption, so as to generate a voltage being at least equal to the minimum charging voltage. Stator-rotor combinations of the type having a low detent torque can be applied suitably.

Alternatively, the interrupting means may comprise a free-wheel clutch arranged in between the driving means and the resilient body. When the resilient body, in this case preferably a spiral spring, is fully released after it has transferred its spring energy to the driven shaft, the reverse tensioning of the spring will be prevented due to the fact that the resilient body is then moving free from the driving means.

It is observed that Swiss Patent Specification 597.636 discloses a driving mechanism for a watch wherein a 36-hours spiral spring additionally drives, through part of the clockwork, an electric generator which generates an alternating voltage having an essentially constant frequency and which feeds an electric circuit for stabilizing the running speed of the clockwork. In this way, the electric generator is a substitute the conventional spring-balance oscillator. In practice, the spiral spring should be permanently in a wound-up state in order to drive the clockwork.

Moreover, it is observed that Patents Abstracts of Japan, volume 2, no. 61 [E-78] (1817), 09.05.1978 & JP-A-53 026169, 03.10.1978 and Patents Abstracts of Japan, volume 2, no. 61 [E-78] (1788), 09.05.1978 & JP-A-53 025472, 03.09.1978 describe a generator in which electromotive force is generated by piezoelectric elements which collide with teeth of an intermittently rotating escape wheel. The generators further comprise a rotating weight, a rectifier, a gear transmission and a crown. However, it appears that there are not any interrupting means for interrupting the transmission between driving means and a driven shaft described in the above-cited documents.

Additionally, Patent Abstracts of Japan, vol. 1, no. 132 [E-77] (6017), 31.10.1977 & JP-A-52 067365, 09.03.1978 describe a generator in which a spiral spring is wound up by means of a rotating weight and subsequently unwound by raising a lever. Interrupting means for at least substantially interrupting the transmission between driving means and a driven shaft are not disclosed.

The generator as described in CH-A-334720 differs from the one according to the invention in the significant absence of a resilient body between the rotating weight and the driving means.

Other features and advantages of the present generator will be elucidated further on the basis of some illustrative embodiments of the invention, referring to the drawing in which.

Figure 7:
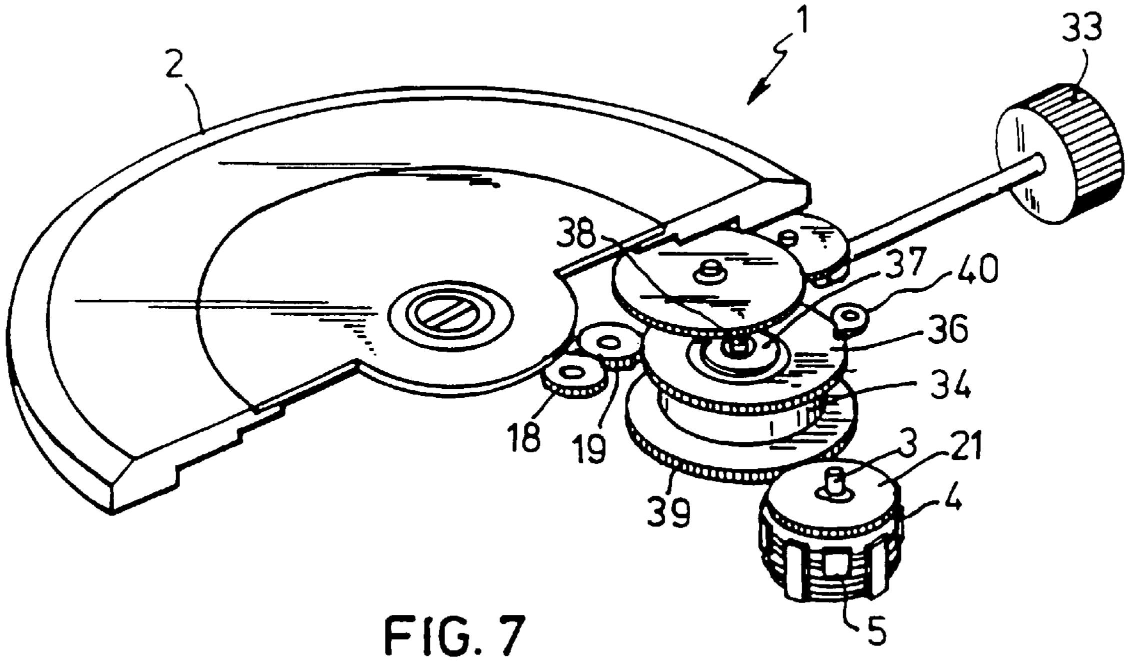
FIG. 7 is a schematic illustration of a fourth embodiment of the generator according to the invention in a perspective view.
Figure 8:
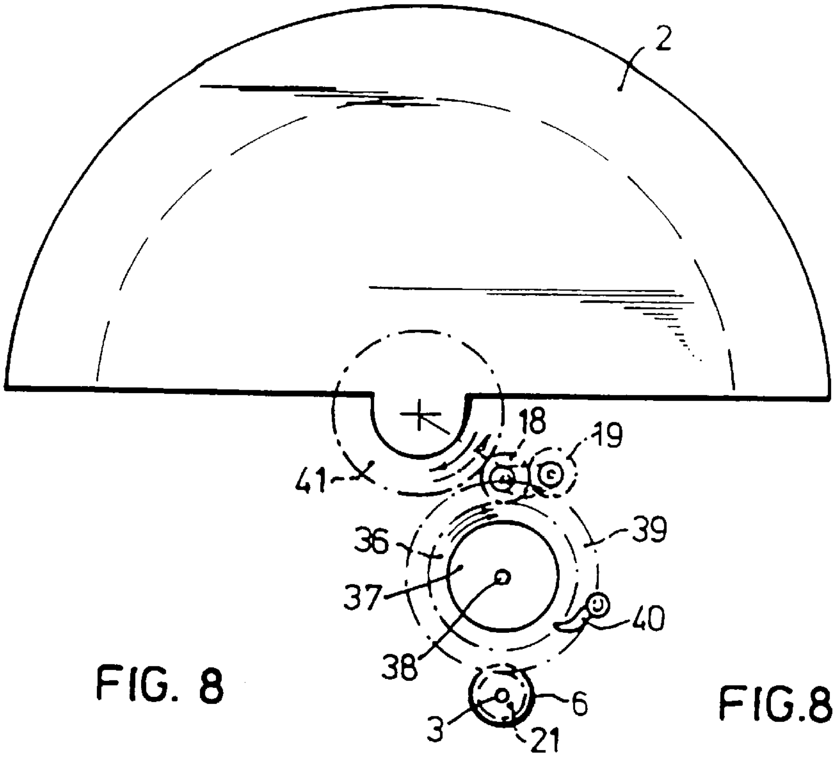
Figure 8A:
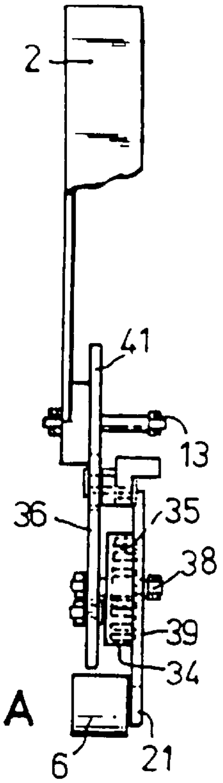
Figure 9:
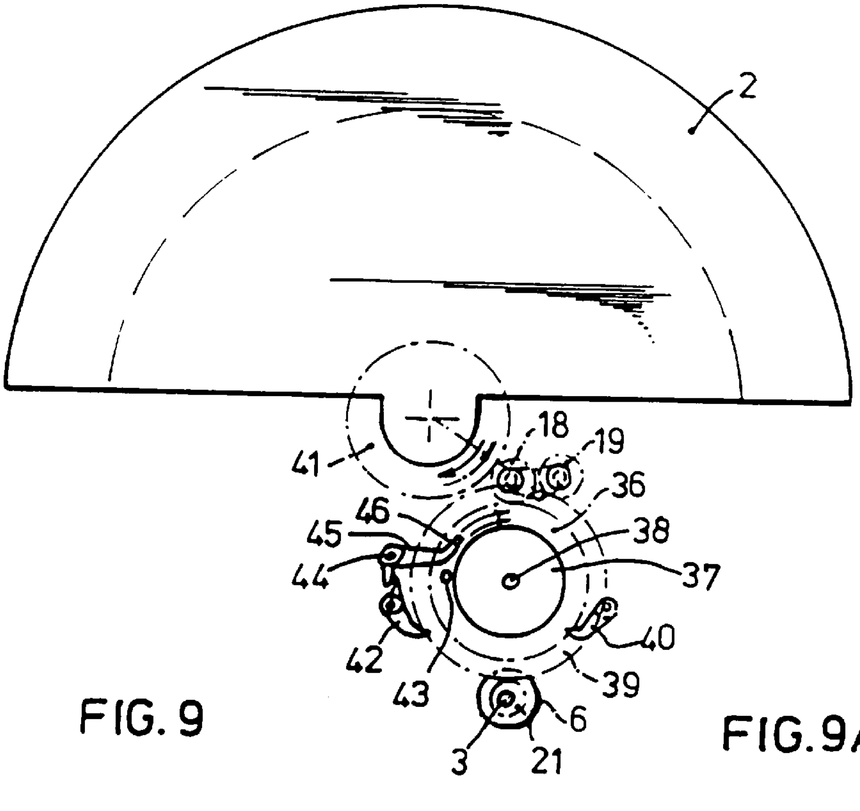
Figure 9A:
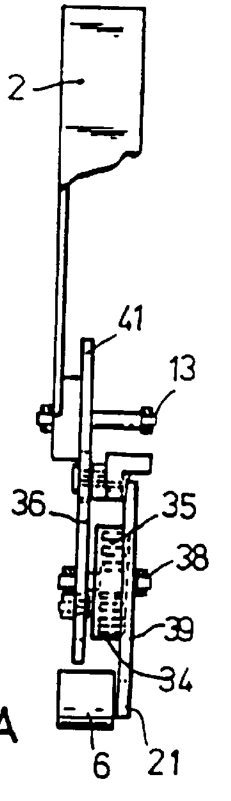

FIGS. 8 and 8A schematically show a top view and a side view of a part of the generator according to FIG. 7; and FIGS. 9 and 9A show a top view and a side view of a modified embodiment of the part of the generator as illustrated in FIG. 8.

In the figures corresponding parts have been marked by identical reference numerals.

Figure 1:
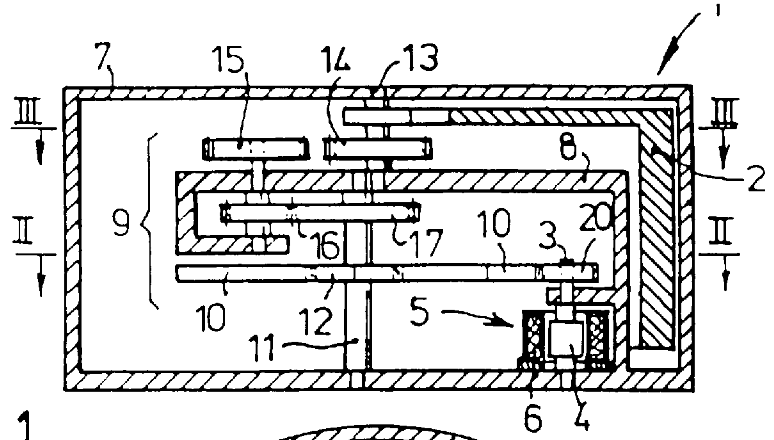
FIG. 1 is a schematic illustration of a longitudinal-section view of a first embodiment of the generator according to the invention.

FIG. 1 schematically shows a longitudinal section of a first embodiment of the generator according to the invention, wherein a generator 1 comprises an eccentric mass 2 and a rotor wheel 4 coupled to a driven shaft 3, said rotor wheel being arranged in a stator 5 with coil windings 6. The several parts are contained in a casing 7 in which a frame 8 is provided to support, inter alia, the eccentric mass 2 and a transmission means 9.

The transmission means 9 comprises a supporting means in the shape of a disc 12 which is rotatable around a shaft 11, and to which leaf springs made of a resilient material are secured. The eccentric mass 2 is coupled to the disc 12, via a shaft 13, by means of a gear unit 14 up to and including 19.

Figure 2:
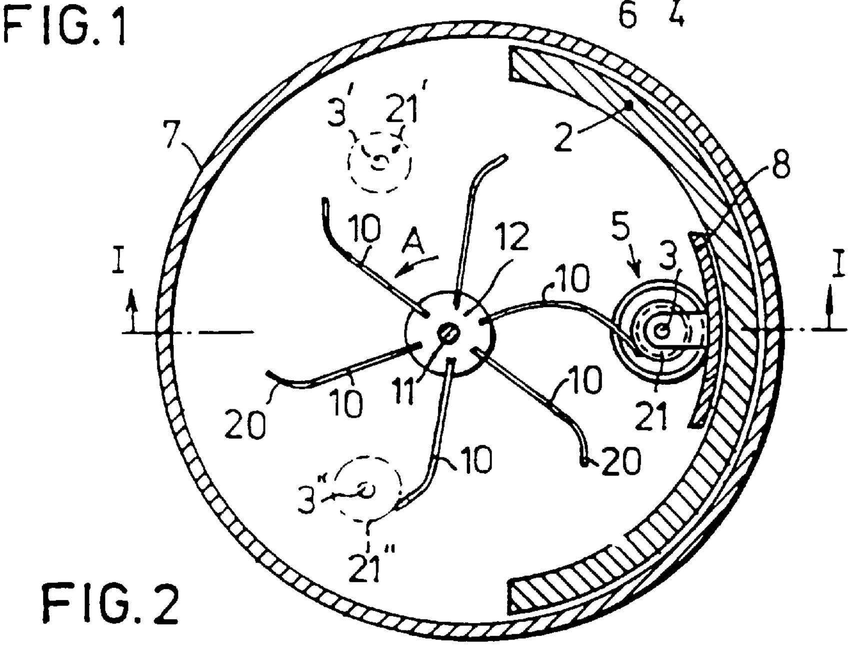
FIG. 2 shows a cross-section of the generator according to line II—II in FIG. 1.

FIG. 2 shows a cross-section of the generator according to line II—II in FIG. 1. A total of six leaf springs 10 has been arranged around the disc 12, each of which having its one end regularly spaced in relation to one another, the leaf springs 10 extending in radial direction from the disc 12. Near the other, free end 20 of each leaf spring 10 a curved part is provided. The length of the leaf springs 10, the shape of the curved part and the distance between the driven shaft 3 and the shaft 11 of the disc 12 have been selected in such a way that during the rotation of disc 12, caused by eccentric mass 2, the convex side of the free end of each leaf spring will co-operate with the driven shaft 3. The direction of rotation of the disc 12, which is defined by the curvature of the free ends 20, is indicated by arrow A in FIG. 2.

In this case, the co-operation between the free end of a leaf spring 10 and the driven shaft 3 is established by an intermediate driven wheel 21 mounted on driven shaft 3. In order to get sufficient friction, driven wheel 21, or each free end 20, may have an appropriate coating and/or be ridged, roughened or serrated.

A leaf spring 10 may hit the driven shaft 3 in such a way that initially a force is exerted which is at least substantially radially directed with respect to the driven shaft 3, thus enabling the leaf spring 10 to be tensioned. As a consequence, a detent torque between the stator and the rotor wheel is not required. When the disc 12 rotates any further, a force will be developed which is tangentially directed with respect to the driven shaft 3, which will eventually rotate the driven shaft. Subsequently, the leaf spring 10 will be released, resulting in the release of at least a part of the stored potential energy for accelerating the driven shaft 3 and, consequently, the rotor wheel. Preferably, the leaf spring 10 remains in contact with the driven shaft 3 until all spring energy has been converted into kinetic energy. In relation to this, if necessary, an appropriate toothed gearing may be provided between the driven shaft 3 and the rotor wheel 4. As the angle through which the leaf spring 10 can be tensioned is relatively small, a relatively large maximum detent torque is required to temporarily store the energy supplied by the eccentric mass. This may be realized by a decelerating toothed gearing, for example, by means of the gear wheels 16 and 17 between the eccentric mass 2 and the disc 12.

However, a large maximum spring torque can be obtained as well by driving the disc 12 by a manual operation means instead of driving by the eccentric mass 2. For miniature power consuming devices, such as a watch, this way of driving can be used for recharging a run-down accumulator within a short time. As for a watch, this situation may occur when the watch has not been worn for a long time. The manual operation means can be a push button which is e.g. coupled by means of a rack and one or more gear wheels to the disc 12 supporting the leaf springs 10. Also the winding knob of a watch, in one of its positions, can serve as a manual operation means. The large maximum spring torque has the advantage that it enables a direct coupling of the winding knob with the disc, in other words without a gear wheel train being required to obtain a proper transmission ratio. In those cases in which both the driving by an eccentric mass and the driving by a manual operation means is required, preferably a decoupling means is provided to decouple the eccentric mass, so that it does not rotate in the event of driving by means of said push button or said winding knob. As for a winding knob, the decoupling may be realized, for example, by pulling out said winding knob to its driving position.

In order to provide in a power consuming device, a watch in particular, both a generator being optimized to be driven by an eccentric mass and a generator being optimized to be driven by a manual operation means, a winding knob in particular, in accordance with the invention a power consuming device is provided which comprises two separate generators according to the invention, which are driven in the respective ways.

If the stator-rotor combination has a detent torque, the co-operation between the leaf spring 10 and the driven shaft 3 will enable the leaf spring to get tensioned, even when a force is already exerted in tangential direction, provided that this force is smaller than the one required to overcome the detent torque. It will be clear that the diameter of the driven wheel 21 is one of the factors which determine the moment of dislodgement of the rotor wheel.

Experiments showed that in this way, each time a leaf spring passes the driven shaft 3, ten revolutions of the rotor wheel can take place.

Figure 3:
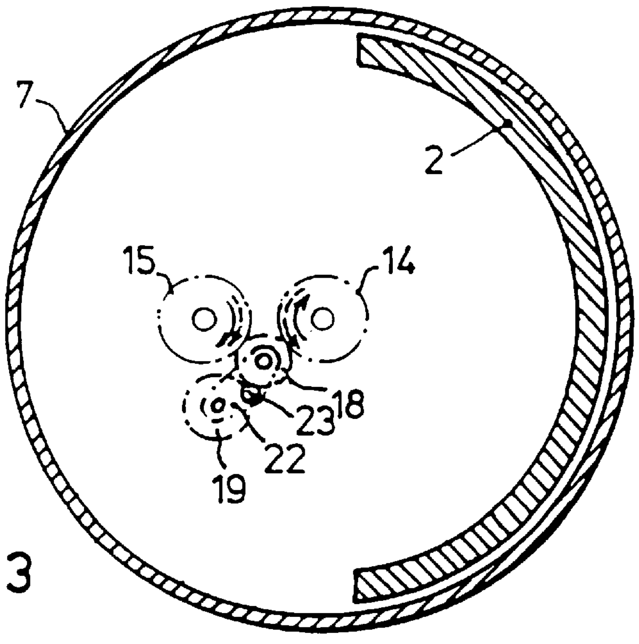
FIG. 3 shows a cross-section according to line III—III in FIG. 1.

In order to permit a rotation of the eccentric mass 2 around the shaft 13 in both directions, despite the predetermined direction of movement according to arrow A of the disc 12, gear wheels 14, 15, 18 and 19 are provided, together constituting a mechanical rectifier, as is schematically illustrated in FIG. 3. The pair of gear wheels 18, 19 is mounted on a plate 22 being rotatable around a shaft 23, in such a way that the gear wheel 14 engages with the gear wheel 15 either by means of the gear wheel 18 or by means of the gear wheels 18 and 19, depending on its direction of rotation.

Figure 4:
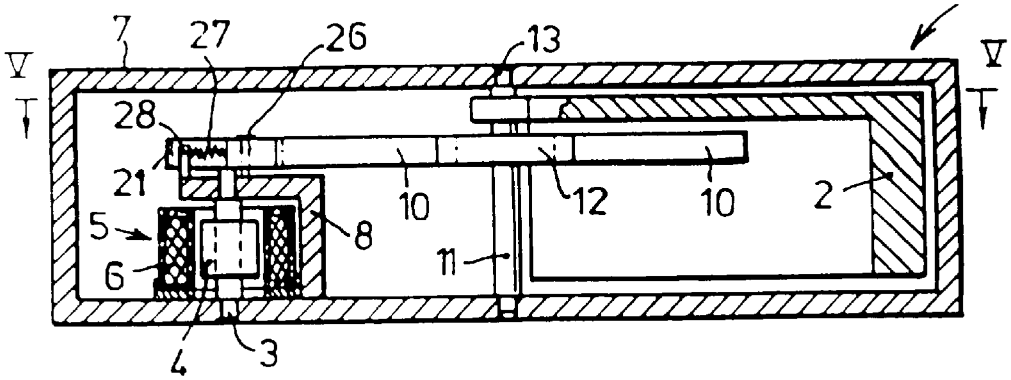
FIG. 4 is a schematic illustration of a longitudinal-section view of a second embodiment of the generator according to the invention.

FIG. 4 shows a second embodiment of the generator according to the invention. The leaf springs 10 are straight. The disc 12 is coupled directly to the eccentric mass 2, so that the shafts 11 and 13 coincide. This construction enables the rotation of disc 12 in both directions, as is indicated in FIG. 5 by the arrows A and B.

The free end 20 of each leaf spring 10 is arrested by an arresting means 23, mounted on the frame 8, before it reaches the driven shaft 3, resulting in the leaf spring being tensioned. As a result, the maximum spring tension, which is reached when a leaf spring is only just arrested by the arresting means, can be defined accurately, so that the generator is able to operate regularly. Thus, the tensioning of the leaf springs is not related to the stator-rotor combination, which may be e.g. of the type having no detent torque or, as in practice, of the type having a negligible detent torque.

Figure 5:
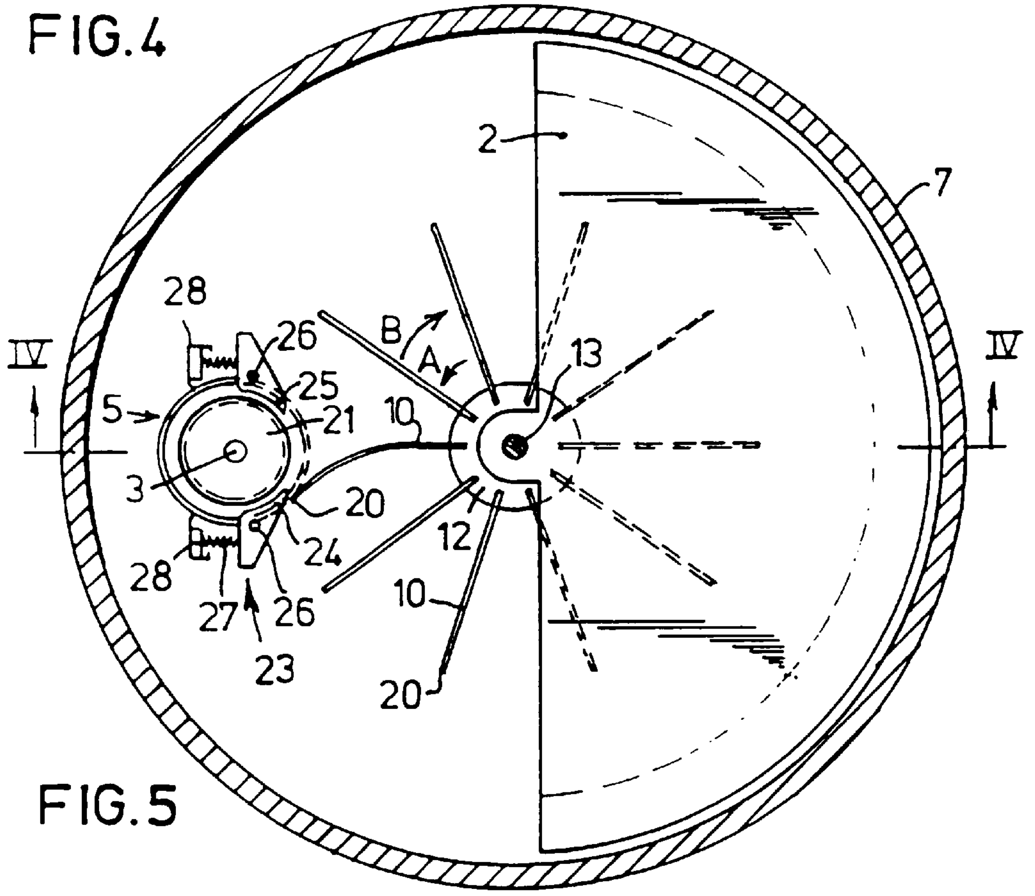
FIG. 5 shows a cross-section of the generator according to line V—V in FIG. 4.

The arresting means 23, being illustrated in detail in FIG. 5, comprises two pawls 24 and 25 arranged at both sides of the driven wheel 21, each of which being rotatable around a related shaft 26 in such a way that upon the passage of a leaf spring 10, as it is moving from the driven shaft 3 in the direction of arrow B, the pawl 25 will be turned away by the free end, so that this pawl does not constitute an obstacle to the leaf spring 10 when the latter is moving away from the driven shaft 3. The pawls 24 and 25 are each reset by a coil spring 27 being pretensioned between a supporting means 28 of the frame 8 and the related pawl 24, 25. FIG. 5 shows a state of the generator in which a leaf spring 10 is only just arrested by the pawl 24 during a rotation of the disc 12 in the direction of arrow B.

The number of leaf springs may be selected in such a way that a subsequent spring starts being tensioned whenever the preceding spring has been fully released, so that a "backlash" of the eccentric mass 2 is avoided.

As, in accordance with the invention, each leaf spring co-operates with the driven shaft only to the extent of a limited angular segment per revolution due to an interruption, the disc 12 and the leaf springs 10 can be properly used for driving more than one driven shaft 3. This is illustrated in FIG. 2 showing via dashed lines a second and a third driven shaft 3', 3" and driven wheel 21', 21", respectively, which are arranged along the track to be followed by the free end of the leaf spring 10, as are the driven shaft 3 and the driven wheel 21. Each driven wheel may be coupled to a related stator-rotor combination. In this way, a leaf spring 10 will co-operate with each of the driven shafts 3, 3', 3", respectively, by means of the respective driven wheels 21, 21', 21". The driven wheels are preferably spaced and arranged in such a way that the load on disc 12 is at least substantially constant during operation.

It is observed that one or more leaf springs 10 can carry with them, individually, a small magnet at their free ends 20, for example, in the shape of a thin layer or a small block of a hard-magnetic material. Along the track to be followed by the free ends 20 during a rotation of the disc 12 one or more induction coils can be mounted to generate an electric voltage upon the passage of a magnet at the free end of a leaf spring, so as to complement or even to substitute for the one or more stator-rotor combinations related to the one or more driven shafts. Thus, an induction coil together with the one or more magnets constitute a voltage generator.

Figure 6:
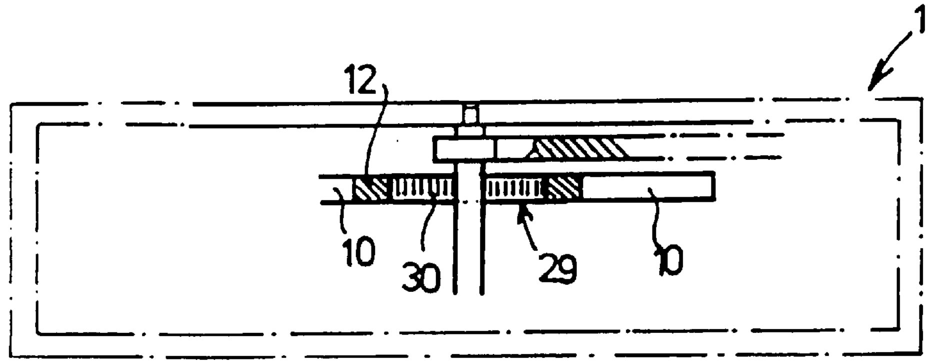
FIG. 6 is a schematic illustration of a longitudinal-section view of a third embodiment of the generator according to the invention.

FIG. 6 shows a schematic illustration of a longitudinal-section view of a third embodiment of the generator according to the invention. The eccentric mass 2 is coupled at its shaft 23 to the inner circumference of the disc 12 by means of relatively slack spiral spring 30 arranged in a hollow space 29 of the disc 12. Thus, the spiral spring 30 permits a movement of the eccentric mass 2 even when the corresponding torque is initially much less than the opposed torque of a leaf spring when the latter co-operates with a driven shaft, or an arresting means.

It will be clear that the driving by hand by means of a manual operation means, comprising e.g. a push button or the winding knob of a watch, as described in referring to FIGS. 1, 2 and 3, can also be used for the embodiments according to FIGS. 4, 5 and 6 as well as the undermentioned embodiments as illustrated in FIGS. 7, 8, 8A, 9 and 9A.

FIG. 7 schematically shows a fourth embodiment of the generator according to the invention. This figure also shows a winding knob 33 for driving the rotor wheel 4 by hand, as has already been discussed above. As is illustrated in detail in FIGS. 8 and 8A, in this embodiment, a rotation of the eccentric mass 2, to which a gear wheel 41 is connected, is transmitted to a spring barrel 34 via said gear wheel 41 and gear wheels 18 and 19, which constitute a rectifier, so as to wind up a spring 35 arranged within said barrel, said spring being a spiral spring in this case. To this end the rectifier 18, 19 engages with a gear wheel 36 which is coupled by a free-wheel clutch 37 to the shaft 38 of the spring barrel 34, to which a first end of the spiral spring is connected. The other end of the spiral spring 35 is connected to the inner side of the barrel 34 to which gear wheel 39 is coupled which engages the driven wheel 21 of the rotor 4. As for this embodiment, the combination of rotor 4 and stator 6 is of the type having a detent torque. A pawl 40 prevents that the spiral spring 35 would be released upon the swing over of the rectifier 18, 19. Whenever the spiral spring 35 has been wound up to an extent that the detent torque has been overcome, the spring 35 will be released while rotating the barrel 34 and the gear wheel 39 and, consequently, rotating the rotor wheel 4 at high speed. As soon as the spring 35 has reached a state of full release, i.e. has arrived in its zero position, the subsequent tensioning of the spring in the opposite direction is prevented by the free-wheel clutch interrupting the transmission between the gear wheel 36 and the shaft 38, i.e. between the eccentric mass 2 and the driven shaft 3, as a result of which the shaft 38 rotates—freely in relation to the gear wheel 36—with the gear wheel 39, and, consequently, the end of the spring connected to the shaft 38 rotates along with the other end of the spring. The potential energy of the spiral spring 35 which is converted into kinetic energy when the zero position is reached, thus remains available in the latter form for driving the driven wheel 21 of the rotor and is not reconverted into potential energy to be stored again in the spring, as is the case in the prior art. Like in the embodiments according to FIGS. 1–6, the effect will be that the spring is released in one motion and in one direction, in other words without the occurence of considerable oscillations which would have led to corresponding oscillations in the amplitude of the generated electric voltage. The time of release of the spiral spring 35 usually varies from a few hundredths to a few tenths of a second.

The free-wheel clutch 37 may be, for example, of the type having clamping balls or pinch rollers or of the type having a pawl co-operating with a dentate wheel to constitute a ratchet. Such free-wheel clutches are known per se, and therefore they will not be described in any more detail. Furthermore, it will be clear that any suitable rectifier may be used instead of the mechanical rectifier as illustrated.

FIGS. 9 and 9A show an embodiment similar to the embodiment according to FIG. 8, wherein the rotor-stator combination may be of the type having a negligible detent torque. The moment of release of the spring 35 is determined by the lifting of an additional pawl 42 which is engaged with the gear wheel 39. The lifting takes place as soon as a protrusion 43 reaches a lever being rotatable around a shaft 44, at its curved end 46. In this example, the protrusion 43 is mounted on the gear wheel 36. Alternatively, the protrusion could co-operate for example via a decelerating mechanism with the gear wheel 36, so that a certain angular displacement of the protrusion 43 with respect to the shaft 38 corresponds to a—in accordance with the deceleration—angular displacement of the spring 35. The pawl 42 is an arresting means for temporarily arresting the spiral spring 35 when it is being wound up. It will be clear that the lifting of the pawl 42 can take place in many different ways, for instance, by means of an additional toothed gearing.

For a given available torque of the eccentric mass, a given available path along which the spring 10 or the spring 35 may be tensioned and a given detent torque of the stator-rotor combination, preferably a spring having a non-linear characteristic is used, wherein the spring constant decreases with increasing displacement. In this way, a maximum amount of energy can be stored in the spring before its release. The spring may be pretensioned to improve this non-linear behaviour. Transmissions having oval gear wheels and/or excentric gear wheels may be used as well to effect a variable torque transmission ratio as a function of the angular displacement, so as to compensate e.g. for an increasing spring tension and/or a non-linear characteristic of the spring.

Like in the embodiment according to FIG. 6 and for the same reason, in the embodiment according to FIGS. 7, 8 or 9 an additional slack spiral spring may be provided which is arranged between the eccentric mass and the spring 35. Moreover, the decelerating transmission as described with reference to FIG. 2 may be arranged between the driving means and the spring 35. Moreover, more stator-rotor combinations may be arranged around the spring barrel 34.

The generator according to the invention may be used as an electric power source in any electric power consuming system which is more or less in motion, or any other system for which the housing of sizeable batteries is undesirable or for which power supply from a mains supply is impossible due to requirements as to the mobility of the system. Watches, pacemakers, and electric circuits implanted in animals, e.g. for registration and identification purposes, are examples of such systems. The signal generated by the generator may be used as well as a measurement of the activity of a person or animal. If a pacemaker is provided, the generated signal of the latter case may be used as a control signal for the pacemaker.

It will be clear to those skilled in the art that within the scope of the invention many alterations can be made to the above-described embodiments of the generator according to the invention.

We claim:

1. Generator (1), for miniature power consuming devices in particular, comprising a rotor wheel (4) being coupled to a driven shaft (3) and having magnetized poles, a stator (5) having a plurality of windings (6) for providing an electric voltage, a driving means (2, 33) for driving the driven shaft (3), and a transmission means (9) having a resilient body (10, 34) for providing a resilient transmission between said driving means (2, 33) and said driven shaft (3), characterized in that interrupting means (37) are provided for at least substantially interrupting the transmission between said driving means (2, 33) and said driven shaft (3) as a function of the spring tension of said resilient body (10).

2. Generator (1) according to claim 1, characterized in that said interrupting means (37) at least substantially interrupt the transmission from the moment said resilient body (10, 34) has at least substantially transferred the spring energy stored therein to said driven shaft (3).

3. Generator (1) according to claim 1, characterized in that the interrupting means (37) comprise a rotatable supporting means (12) which is coupled to said driving means (2, 33), one end of said at least one resilient body (10) being connected to the rotatable supporting means (12), its other end being a free end (20) which cooperates during the rotation of said supporting means (12) at intervals with said driven shaft (3) in order to rotate said rotor wheel (4).

4. Generator (1) according to claim 3, characterized in that said at least one resilient body (10) is a substantially elongated body extending mainly in radial direction from said supporting means (12).

5. Generator (1) according to claim 3, characterized in that a plurality of resilient bodies (10) are regularly spaced around said supporting means (12).

6. Generator (1) according to claim 3, characterized in that said at least one resilient body (10) is a leaf spring.

7. Generator (1) according to claim 3, characterized in that said at least one resilient body (10) is curved at its free end, the convex side of which is adapted to cooperate with the driven shaft (3).

8. Generator (1) according to claim 3, characterized in that an arresting means (23) is provided which is arranged along the track to be followed by said free end of said at least one resilient body (10) in such a way that said resilient body (10) is temporarily arrested at its free end by said arresting means (23) before it reaches the driven shaft (3).

9. Generator (1) according to claim 8, characterized in that the arresting means (23) comprises at least one pawl (24, 25) arranged at a side of the driven shaft (3).

10. Generator (1) according to claim 9, characterized in that said at least one pawl (24, 25) is rotatable around an axis so as to be turned away by said free end of said resilient body (10) when said resilient body (10) passes said pawl (24, 25) in a direction away from said driven shaft (3).

11. Generator (1) according to claim 10, characterized in that at least one spring means (27) is provided for resetting the pawl (24, 25) after it has been turned away.

12. Generator (1) according to claim 3, characterized in that on said driven shaft (3) a driven wheel (21) is mounted which has an edge surface adapted to cooperate by friction with said free end of said at least one resilient body (10).

13. Generator (1) according to claim 3, characterized in that a plurality of said resilient bodies (10) is provided, each of which comprises a hard-magnetic material at its free end (20) which is adapted to cooperate with at least one stationary induction coil.

14. Generator (1) according to claim 1, characterized in that said interrupting means comprise a free wheel clutch (37) provided between said driving means (2, 33) and said resilient body.

15. Generator (1) according to claim 14, characterized in that said resilient body comprises a spiral spring (35) contained in a spring barrel (34).

16. Generator (1) according to claim 15, characterized in that an arresting means in the shape of a pawl (42) is provided which co-operates with said spiral spring (35) for temporarily arresting said spiral spring (35) when it is being wound up, the pawl (42) being lifted by a protrusion (43) when a predetermined angular displacement of said spiral spring (35) has been reached.

17. Generator (1) according to claim 1, characterized in that a mechanical rectifier (18, 19) is mounted between said driving means (2, 33) and said resilient body (34, 35).

18. Generator (1) according to claim 1, characterized in that a plurality of driven shafts (3, 38) is provided, each of which is cooperating with said at least one resilient body (10, 34).

19. Generator (1) according to claim 1, characterized in that the stator-rotor combination formed by said rotor wheel (4) and said stator (5) is of the type having a negligible detent torque.

20. Generator (1) according to claim 1, said driving means comprising an eccentric mass (2), characterized in that a decelerating toothed gearing (14–19) is provided between said eccentric mass and said resilient body.

21. Generator (1) according to claim 1, said driving means comprising an eccentric mass (2), characterized in that said resilient body is coupled to said eccentric mass by means of an additional resilient body.

22. Generator (1) according to claim 21, characterized in that said additional resilient body is a spiral spring.

23. Generator (1) according to claim 1, characterized in that said driving means comprises a manual operation means, a winding knob (33) in particular.

24. Generator (1) according to claim 23, said driving means comprising an eccentric mass, characterized in that a decoupling means is provided to decouple said eccentric mass when driving via said manual operation means.

25. Timepiece, particularly a watch, provided with a manual operation means, said timepiece comprising:

a first generator (1), said first generator comprising a rotor wheel (4) being coupled to a driven shaft (3) and having magnetized poles, a stator (5) having a plurality of windings (6) for providing an electric voltage, a driving means (2, 33) for driving the driven shaft (3), and a transmission means (9) having a resilient body (10, 34) for providing a resilient transmission between said driving means (2, 33) and said driven shaft (3), characterized in that interrupting means (37) are provided for at least substantially interrupting the transmission between said driving means (2, 33) and said driven shaft (3) as a function of the spring tension of said resilient body (10), the driving means comprising an eccentric mass (2); and a second generator, said second generator comprising a rotor wheel (4) being coupled to a driven shaft (3) and having magnetized poles, a stator (5) having a plurality of windings (6) for providing an electric voltage, a driving means (2, 33) for driving the driven shaft (3), and a transmission means (9) having a resilient body (10, 34) for providing a resilient transmission between said driving means (2, 33) and said driven shaft (3), characterized in that interrupting means (37) are provided for at least substantially interrupting the transmission between said driving means (2, 33) and said driven shaft (3) as a function of the spring tension of said resilient body (10), the driving means comprising said manual operation means (33).

26. Timepiece according to claim 25 wherein said manual operation means comprises a winding knob.

* * * * *